(12) United States Patent
Cornett et al.

(10) Patent No.: US 7,901,186 B2
(45) Date of Patent: Mar. 8, 2011

(54) SEAL ASSEMBLY

(75) Inventors: Kenneth W. Cornett, Ivoryton, CT (US); Christopher D. Mahoney, Hamden, CT (US)

(73) Assignee: Parker Hannifin Corporation, Cleveland, OH (US)

( * ) Notice: Subject to any disclaimer, the term of this patent is extended or adjusted under 35 U.S.C. 154(b) by 1021 days.

(21) Appl. No.: 11/853,966

(22) Filed: Sep. 12, 2007

(65) Prior Publication Data

US 2009/0053055 A1 Feb. 26, 2009

Related U.S. Application Data

(60) Provisional application No. 60/825,280, filed on Sep. 12, 2006.

(51) Int. Cl.
*F01D 5/06* (2006.01)
(52) U.S. Cl. ............... 416/198 A; 416/201 R; 415/135; 415/136; 415/170.1; 415/174.2; 277/643; 277/649
(58) Field of Classification Search .............. 415/135, 415/136, 138, 170.1, 174.2; 416/95, 193 A, 416/198 A, 199, 200 A, 201 R; 277/548, 277/566, 643, 644, 649
See application file for complete search history.

(56) References Cited

U.S. PATENT DOCUMENTS

| | | | |
|---|---|---|---|
| 3,728,041 A | 4/1973 | Bertelson |
| 3,975,114 A | 8/1976 | Kalkbrenner |
| 4,063,845 A | 12/1977 | Allen |
| 4,537,024 A | 8/1985 | Grosjean |
| 4,902,198 A | 2/1990 | North |
| 5,088,888 A | 2/1992 | Bobo |
| 5,125,796 A | 6/1992 | Cromer |
| 5,158,430 A | 10/1992 | Dixon et al. |
| 5,167,485 A | 12/1992 | Starkweather |
| 5,221,096 A | 6/1993 | Heldreth et al. |
| 5,249,920 A | 10/1993 | Shepherd et al. |

(Continued)

FOREIGN PATENT DOCUMENTS

EP 0767329 4/1997

(Continued)

OTHER PUBLICATIONS

PCT/US2007/078239; PCT International Search Report dated Dec. 18, 2007.

*Primary Examiner* — Igor Kershteyn
(74) *Attorney, Agent, or Firm* — Renner, Otto, Boisselle & Sklar, LLP

(57) ABSTRACT

A seal assembly (60) for sealing first and second static parts (40A, 40B) with opposed slots (44A, 44B) together forming a pocket (46). The seal assembly (60) comprises a floor strip (70) positioned adjacent the pocket's floor (48) and a ceiling strip (80) positioned adjacent the pocket's ceiling (50). A connection (90) of the strips' central portions (72, 82) provides a flat hinge between cooperating hinge portions (76, 86). A first set of the hinge portions (76A-86A) converge for insertion into the first slot (44A) and a second set of hinge portions (76B-96B) converge for insertion into the second slot (44B). After such slot insertion and pocket installation, the converged hinge portions (76A-86A, 76B-86B) resiliently diverge within the pocket to seat the floor strip's end portions (74A, 74B) against the pocket's floor (48) and to seat the ceiling strip's end portions (84A, 84B) against the pocket's ceiling (50).

20 Claims, 4 Drawing Sheets

U.S. PATENT DOCUMENTS

Figure 1:
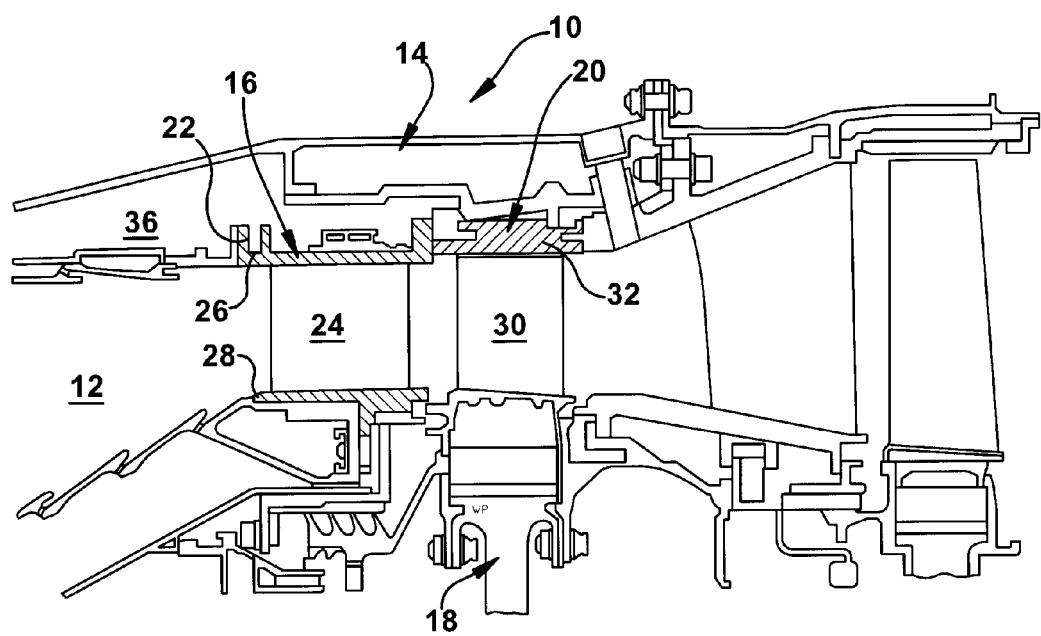

| | | | |
|---|---|---|---|
| 5,586,773 | A | 12/1996 | Bagepalli et al. |
| 5,743,708 | A | 4/1998 | Cunha et al. |
| 5,823,741 | A | 10/1998 | Predmore et al. |
| 5,865,600 | A | 2/1999 | Mori et al. |
| 6,193,240 | B1 | 2/2001 | Johnson et al. |
| 6,413,042 | B2 | 7/2002 | Correia |
| 6,431,825 | B1 | 8/2002 | McLean |
| 6,733,234 | B2 | 5/2004 | Paprotna et al. |
| 6,843,479 | B2 | 1/2005 | Burdgick |
| 6,883,807 | B2 | 4/2005 | Smed |
| 6,926,284 | B2 | 8/2005 | Hirst |
| 7,316,402 | B2 * | 1/2008 | Paauwe .................. 277/641 |
| 7,788,932 | B2 * | 9/2010 | Kunitake et al. ........... 60/797 |

FOREIGN PATENT DOCUMENTS

| | | |
|---|---|---|
| GB | 2303888 | 3/1997 |

* cited by examiner

SEAL ASSEMBLY

RELATED APPLICATION

This application claims priority under 35 U.S.C. §119 (e) to U.S. Provisional Patent Application No. 60/825,280 filed on Sep. 12, 2006. The entire disclosure of this provisional application is hereby incorporated by reference.

BACKGROUND

A gas turbine engine can comprise a combustion chamber, wherein fuel is mixed with air to generate hot combustion gasses, and a turbine, wherein the gasses are expanded and energy extracted therefrom. A turbine will often comprise an assembly (e.g., a nozzle assembly, a shroud assembly, etc.) constructed from a plurality of segments circumferentially adjoined to form a circular array. Interfacing circumferential parts of the segments commonly have opposed slots, which together form a pocket (having a floor and a ceiling). A seal is installed in the pocket to prevent leakage in a path substantially perpendicular to its floor and ceiling.

SUMMARY

A seal assembly has a generalized geometry (i.e., cross-sectional shape) that can be tailored to fit a plentitude of pocket sizes/shapes and can be optimized for a multitude of sealing applications. The seal can be constructed from two metallic strips (a floor strip and a ceiling strip) cut from a continuous supply of stock material. A connection of the strips' central portions provides a flat hinge between cooperating hinge portions. A first set of the hinge portions converge for insertion into the pocket's first slot and a second set of hinge portions converge for insertion into the pocket's second slot. After such slot insertion and pocket installation, the converged hinge portions diverge within the pocket to seat the floor strip's end portions against the pocket's floor and to seat the ceiling strip's end portion against the pocket's ceiling.

The overall strip lengths can selected to fit a particular pocket. And the relative dimensions (and arrangement) of specific strip portions can be customized to optimize contact area, seating load, springback potential, stress-relaxation and other seal-performance-effecting parameters. These and other features of the seal assembly are fully described and particularly pointed out in the claims. The following description and annexed drawings set forth in detail certain illustrative embodiments, these embodiments being indicative of but a few of the various ways in which the principles may be employed.

DRAWINGS

FIG. 1 is a schematic cross-section of a gas turbine engine comprising at least one segmented assembly (e.g., a nozzle assembly, a shroud assembly, etc.) having interfacing parts and a seal assembly installed in a pocket formed by slots in the interfacing parts.

Figure 2:
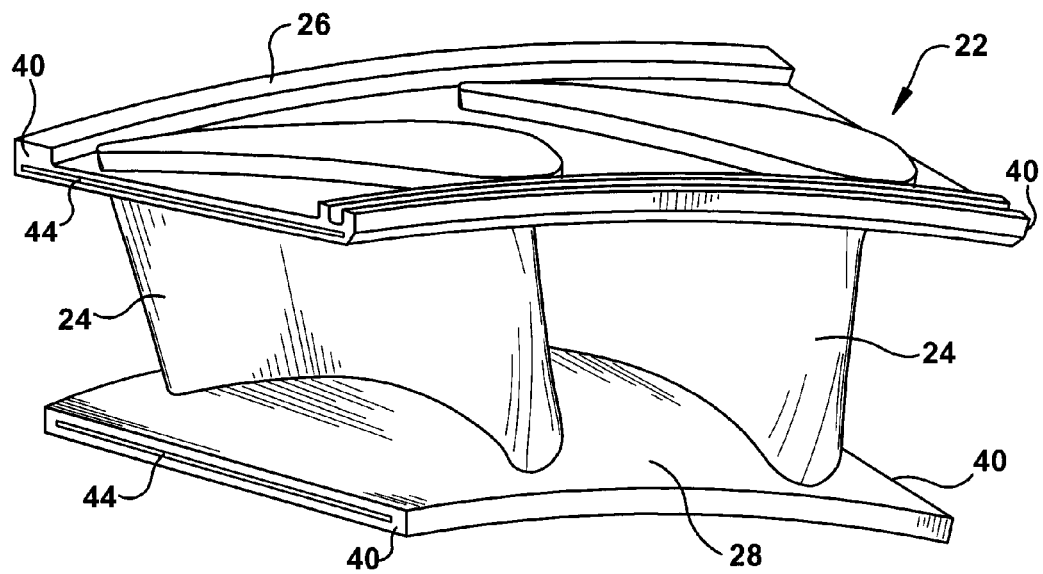
Figure 3:
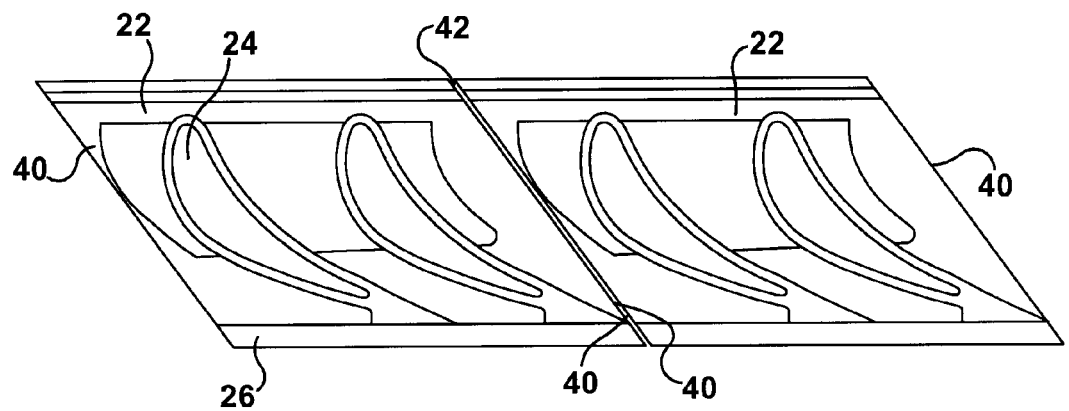
Figure 4:
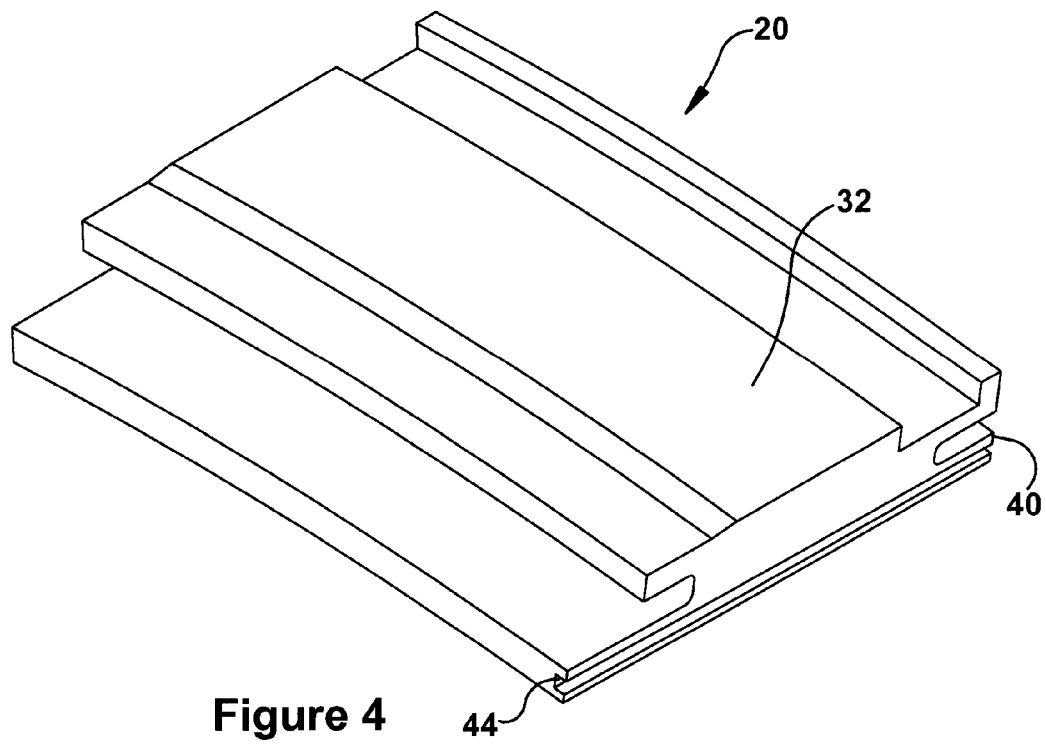
Figure 5:
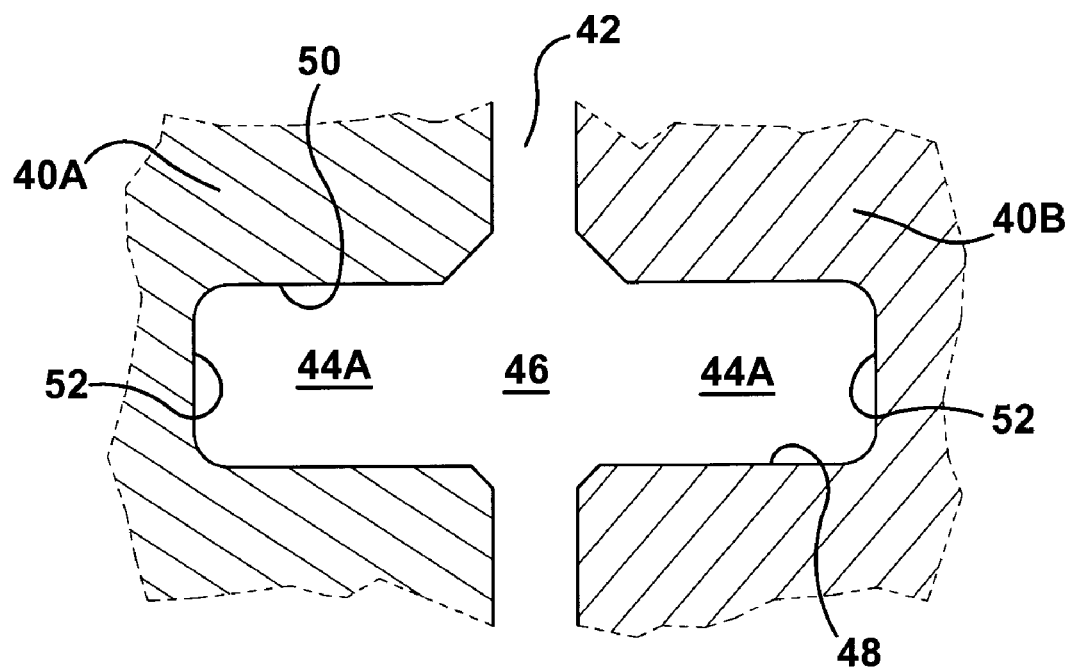
Figure 6:
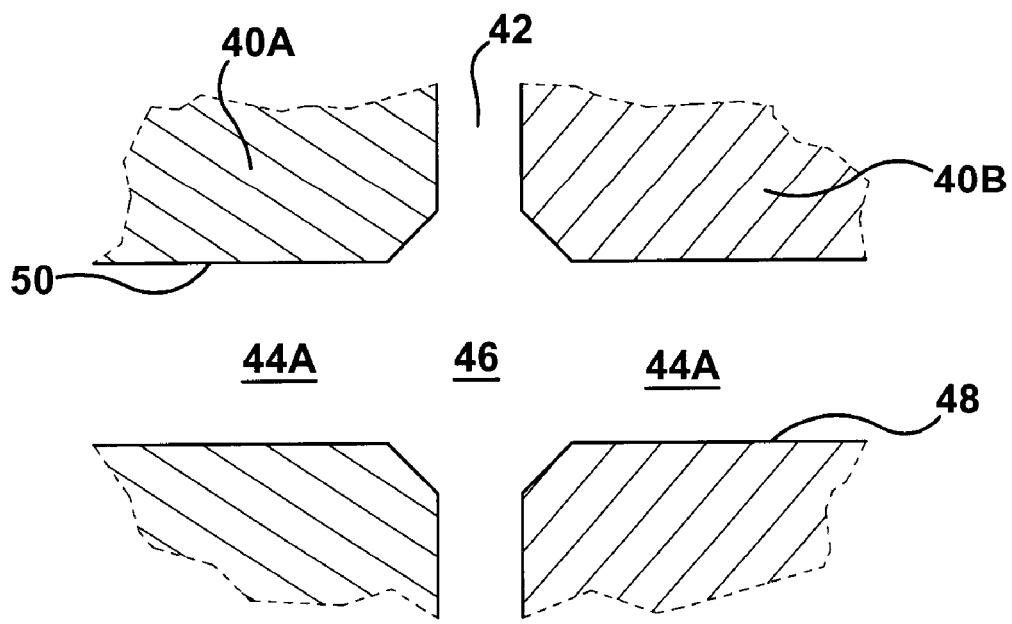

FIG. 2 is a perspective view of a nozzle segment.
FIG. 3 is a radial view of two adjacent nozzle segments.
FIG. 4 is a perspective view of a shroud segment.
FIG. 5 is a closeup sectional view of the interfacing parts and the pocket formed thereby.
FIG. 6 is a sectional view similar to FIG. 5, except that the pocket is wall-less.

Figure 7:
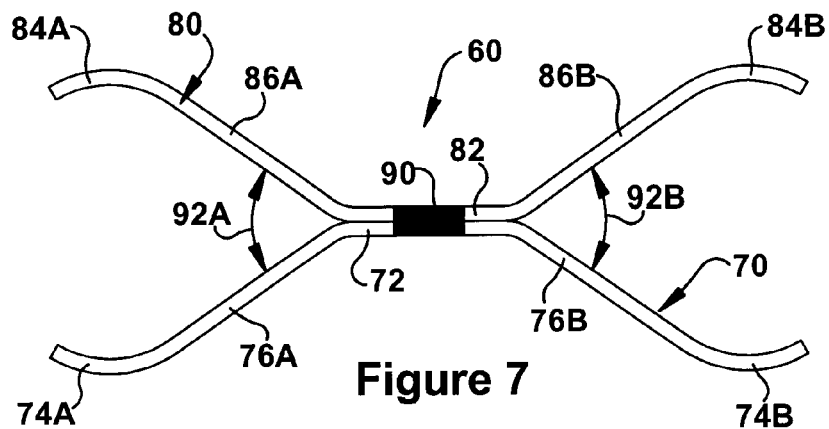
Figure 8:
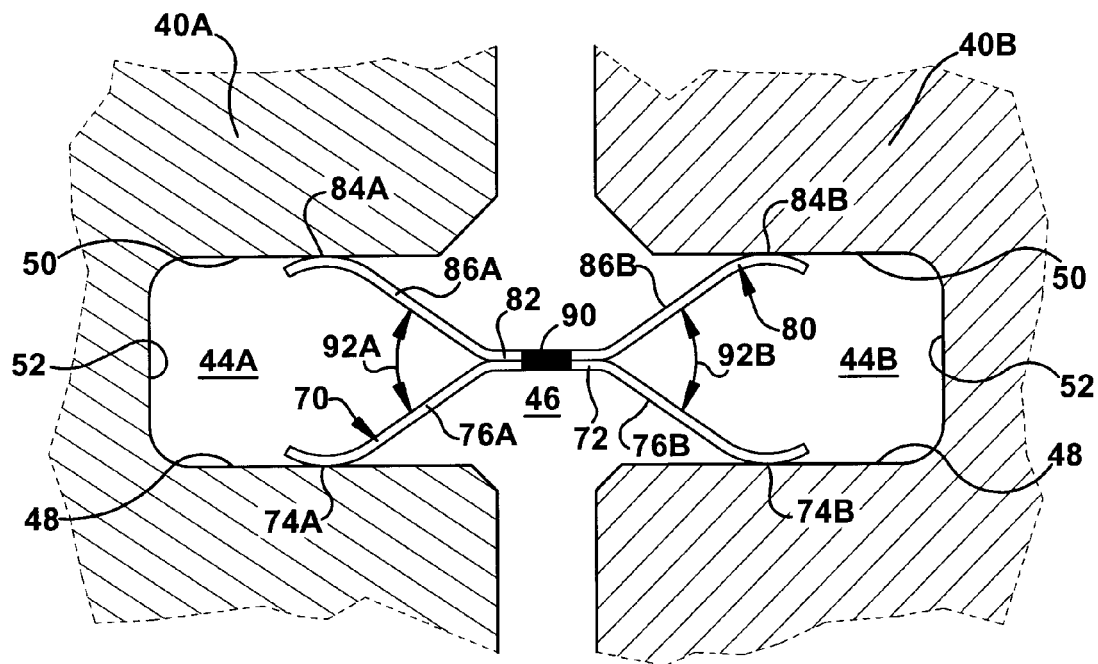
Figure 9:
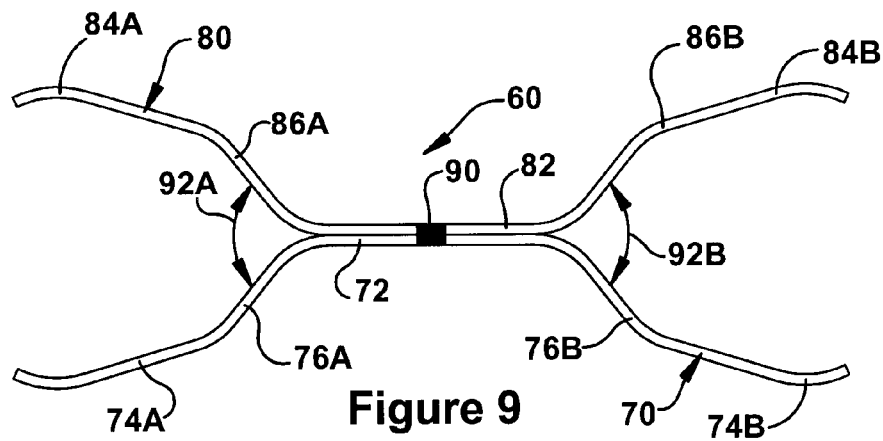

FIG. 7 is a sectional view of a seal assembly for sealing the interface between adjacent segments, the seal assembly being shown in a relaxed state.
FIG. 8 is a sectional view of the seal assembly installed in the pocket.
FIG. 9 is a sectional view of another seal assembly in a relaxed state.

DESCRIPTION

Referring now to the drawings, and first to FIG. 1, an gas turbine engine 10 is shown. The engine 10 can comprise a combustion chamber 12, wherein fuel is mixed with air to generate hot combustion gasses, and a turbine 14, wherein the gasses are expanded and energy extracted therefrom. The turbine 14 includes a nozzle assembly 16, a rotor assembly 18, and a shroud assembly 20. The nozzle assembly 16 and the shroud assembly 20 are stationary flowpath components, and the rotor assembly 18 rotates about the engine centerline.

The nozzle assembly 16 comprises a plurality circumferentially adjoining nozzle segments 22, each segment 22 having a vane structure (e.g., two vanes 24) disposed between an outer band 26 and an inner band 28. The rotor assembly 18 comprises a plurality of buckets 30. And the shroud assembly 20 comprises a plurality of circumferentially adjoining shroud segments 32 that closely surround the rotor buckets 30. The nozzle's outer bands 26 and the shroud segments 32 define the outer flowpath boundary for combustion gasses in turbine 14.

A cooling jacket 36 can surround the combustion chamber 12 and the turbine 14. Air and/or another medium is pushed through the jacket 36 to cool the combustion liners and the thermally exposed turbomachinery. A jacket 36 and/or other cooling techniques permit extremely elevated inlet temperatures, and thus improved engine thermal efficiency.

Referring now to FIG. 2, an isolated nozzle segment 22 is shown. The outer band 26 includes circumferential edge parts 40 and the inner band 28 includes circumferential edge parts 40. When the plurality of nozzle segments 22 are encircled to form the assembly 16, adjacent outer-band edge 40 are adjoined. And adjacent inner-band edge parts 40 are adjoined. (See FIG. 3.) As shown in FIG. 4, the shroud segments 32 have similar edge parts 40 and they are encircled a similar manner to form the assembly 20.

A closeup of the interface between a first static part 40A and a second static part 40B is shown in FIG. 5. The parts 40A/40B have opposed slots 44A/44B that together form a pocket 46 having a floor 48 and a ceiling 50. The parts 40A/40B can include a connecting wall 52 between the floor 48 and the ceiling 50 as is shown in FIG. 5. But as shown in FIG. 6, wall-less slots 44A/44B are also possible. In either or any event, the pocket 46 will be coextensive with the edges of the parts 40A and 40B.

In the illustrated turbine engine 10, the exterior of the nozzle assembly 16 (and/or the shroud assembly 20) is surrounded by the cooling medium, while its interior contains combustion gas medium. The pocket 46 is situated between these two mediums. An expected leak path will be substantially perpendicular to the pocket's floor 48 and/or its ceiling 50.

A seal assembly 60 for sealing the interface between a first part 40A/50A and a second part 40B/50B is shown in FIG. 7. The seal assembly 60 comprises a floor strip 70, a ceiling strip 80, and a connection 90 therebetween. The floor strip 70 can have a uniform thickness whereby it may be cut from a continuous supply of stock, and the ceiling strip 80 can have a uniform thickness whereby it may be cut from a continuous supply of stock. The strips' length, and/or the seal assembly's length, can correspond to the pocket's length.

The floor strip 70 and/or the ceiling strip 80 can comprise any suitable material having the strength, resiliency, and resistance at expected operating conditions. In engine and turbine applications, the strips 70/80 can be made from a metallic material having high stress and oxidation resistance properties at elevated temperatures. The strip materials can be superalloy materials including, for example, nickel-based superalloys, iron-based superalloys, cobalt-based superalloys, and nickel-iron based superalloys. The strips can be coated with a metal and/or a superalloy that is the same as, or different from, the underlying material.

The floor strip 70 may be made of the same material(s) and/or have the same strip thickness as the ceiling strip 80. An essential identity between the strips 70-80 can facilitate manufacturing as only one stock supply would be necessary. But different materials and/or thickness may help optimize seal performance in some circumstances. For example, in the illustrated embodiment, the properties of the floor strip 70, which is exposed to high temperature combustion gasses, can be optimized to provide maximum resistance to oxidation. The properties of the ceiling strip 80, which is exposed to the cooling medium, can be optimized for maximum wear resistance.

Straight, planar, linear, curved, concave, curtailed, or other geometries of particular strip portions can be accomplished by an appropriate process, such as hammer forging, bending, drawing, pressing, roll forming, and/or combinations thereof.

The floor strip 70 comprises a central portion 72, a first end portion 74A, a first hinge portion 76A, a second end portion 74B, and a second hinge portion 76B. The ceiling strip 80 comprises a central portion 82, a first end portion 84A, a first hinge portion 86A, a second end portion 84B, and a second hinge portion 86B. The floor strip's portions 72, 74A, 76A, 74B, and 76B are coextensive, and the ceiling strip's portions 82, 84A, 86A, 84B, and 86B are coextensive.

The connection 90 connects the central portions 72 and 82 together, to provide a common joint for the first hinge portions 76A and 86A, and the second hinge portions 76B and 86B. The connection 90 can comprise any appropriate metallurgical connection, such as welds, brazes, rivets, screws, bolts, and other mechanical connections, that maintains its integrity at expected temperatures. For example, if the connection 90 comprises a weld, the weld can comprise electrical resistance welds, arc welds, cold welds, electron beam welds, laser beam welds, solid state welds, explosion welds, ultrasonic welds, and combinations thereof.

The central portions 72 and 82 are preferably flat or planar (i.e., not curved). Such flatness can facilitate formation of the connection 90. Depending upon the connection technique, the connection 90 can also assume a flat or planar profile, as in the illustrated seal assembly 60.

The connection 90 results in the strips 70/80 being integrally joined so that the seal assembly 60 is essentially a single-piece assembly. This unitary connection 90, and the two-strip construction (especially when each strip 70/80 can be cut from a continuous supply of stock), facilitates fabrication of the seal assembly 60. The resulting single-piece assembly 60 can ease inventory demands and simplify installation, as multiple pieces do not need to be stored, located, and/or assembled.

The first end portions 74A/84A can be symmetrical relative to each other, the second end portions 74B/84B can be symmetrical relative to each other, and/or the first end portions 74A/84A can be symmetrical relative to the corresponding second end portions 74B/84B. The end portions 74 and 84 preferably each have salient seating areas and curtailed edges distal thereto. In the illustrated embodiment, this preferred profile is achieved by incurved end portions so that the seating areas are convexly shaped. But corner-like bending or other strategies are certainly possible and contemplated.

The first hinge portions 76A/86A project in a lever-like manner from a first side of the connection 90 and the second hinge portions 76B/86B project in a lever-like manner from a second side of the connection 90. The projecting first hinge portions 76A/86A form a first hinge angle 92A therebetween and the second hinge portions 76B/86B form a second hinge angle 92B therebetween. For given portion dimensions, the first hinge angle 92A determines the distance between first end portions 74A and 84A, and the second hinge angle 92B determines the distance between the second end portions 74B and 84B. In the relaxed state of the seal assembly 60 shown in FIG. 7, this distance is greater than the height of the pocket 46.

Each hinge portion 76/86 can follow a substantially straight or linear path between its respective central portion 72/82 and its respective end portion 74/84. The hinge portion 76/86 can angularly divert from its respective central portion 72/82 and tangentially translate into its respective end portion 74/84. (This tangential translation, in combination with the curved end-portion shape, results in these portions having a wishbone-like shape.) As with the end portions 74/84, same-slot-side and/or opposite-slot-side hinge portions 76/86 can be symmetrical relative to each other.

The purpose of the hinge portions 76/86 is to converge for pocket insertion and to diverge for biased seating of the end portions 84/86 against pocket surfaces. Hinge portions 76/86 following straight (e.g., planar, linear) paths, and the angular hinge they form with the connection 90, can optimize a seal's convergence-divergence properties for a given pocket space. Curved hinge portions 76/86, for example, can occupy more pocket space and/or result in less angular resilience.

To install the seal assembly 60, the first hinge portions 76A/86A are caused to converge. This convergence can be accomplished by squeezing or pressing together the hinge portions 76A/86A and/or the end portions 74A/84A in a tweezers-like manner. In any event, this convergence narrows the first hinge angle 90A and reduces the distance between the end portions 74A/84A to less than the pocket height, allowing them to be inserted into the slot first 42A. (Curtailed ends of the portions 74A/84A can serve as lead-in edges during insertion.) The second hinge portions 76B/86B are likewise converged for similar insertion of the second end portions 74B/84B into the second slot 44B.

The sealing assembly 60 is shown installed in the pocket 46 in FIG. 8. The converged first hinge portions 76A/86A are biased to diverge within the pocket 46 to widen the first hinge angle 92A. The converged second hinge portions 76B/86B are biased to diverge within the pocket 46 to widen the second hinge angle 92B. The diverged hinge angles 92 are greater than the converged hinge angle 92 (for installation) but less than the relaxed hinge angle. Thus, the diverged distance between the end portions 74/84 are greater than their converged distance but less than their relaxed distance. This forcibly seats (i.e., loads) the end portions 74 of the floor strip 62 against the pocket's floor 48 and the end portions 84 of the ceiling strip 64 against the pocket's ceiling 50.

The first hinge angle 92A and the second hinge angle 92B can be approximately equal when the hinge portions 76/86 are in a relaxed state, and/or when they are in a diverged state within the pocket. Such approximate angle equality may have the best chance of a balanced seal, when the strips 70/80 (and the slots 42) are the same and symmetrical. But with different strip shapes, thickness, or materials (and/or with different slot shapes) non-equal hinge angles 92 might be better balancers.

In any event, the first hinge angle 92A and/or the second hinge angle 92B can each be between approximately 10° and 80°, between approximately 20° and 70°, and/or approximately between 30° and 60° when the seal 60 is in the relaxed state. When the seal 60 is in the diverged post-pocket-installation state, the hinge angles 92 can be between approximately 1° and 10° less, between approximately 2° and 8° less, and/or between approximately 3° and 7° less than they are in the relaxed state. When the seal 60 is converged for installation into the pocket 46, the hinge angles 92 can be between approximately 1° and 20° less, between approximately 5° and 15° less, and/or between approximately 5° and 10° less than they are in the relaxed state. Smaller convergence angles are possible, provided that the hinge portions 76/86 can still elastically converge upon release of compression.

The overall dimensions of the seal assembly 60 can be scaled to fit into varying pocket sizes and shapes. In the illustrated embodiment, the central portion 72, the end portions 74A/74B, and the hinge portions 76A/76B of the floor strip 70 cumulatively define its overall length. And the central portion 82, the end portions 84A/84B, and the hinge portions 86A/86B of the ceiling strip 80 cumulatively define its overall length. Thus, these overall lengths would be sized to fit within an expected range of pocket widths.

In turbine applications, part-to-part shifting is often unavoidable due to thermal expansion and other factors, whereby pocket width may change during use of the seal 60. In the illustrated seal assembly 60, the strips' overall lengths are less than the pocket's width so as to avoid contact with the slot's side walls 52 at most expected pocket widths. This feature, and/or the curved seating shape of the end portions 74/84 can facilitate sliding on the pocket's floor/ceiling surfaces (without a loss of sealing contact). Low friction siding can reduce stress/wear on the seal assembly 60 and thereby prolong its life and performance.

Even with a given pocket-width range and/or overall-seal length, the relative dimensions of the strips' portions can be customized to optimize the contact area, seating load, spring-back potential, stress-relaxation and other seal-performance-effecting parameters.

In the seal assembly 60 shown in FIGS. 7 and 8, for an example, each central portion 72/82 is at least as least as long as (or longer than) one of its end portions 74/84. Each hinge portion 76/86 is as least as long as (or longer than) its coextensive central portion 72/84. Also, each coextensive pair, of an end portion 74/84 and a hinge portion 76/86, are at least as long as (or longer than) the coextensive central portion 72/82.

In the seal assembly 60 shown in FIG. 9, for another example, each central portion 72/82 is at least as long (or longer than) one of its hinge portions 76/86. And each hinge portion 76/86 is shorter than its coextensive end portion 72/82. This seal assembly 60 has tighter hinge angles 92 and larger seating areas than the seal assembly 60 shown in FIGS. 7-8.

Thus, the seal assembly 60 has a generalized geometry (i.e., cross-sectional shape) that can be tailored to fit a plentitude of pocket sizes/shapes and can be optimized for a multitude of sealing applications. Although the seal assembly 60 has been shown and described with respect to a certain embodiment or embodiments, it is obvious that equivalent alterations and modifications will occur to others skilled in the art upon the reading and understanding of this specification and the annexed drawings. Also, the seal assembly 60 need not be used with nozzle segments, shroud segments, or even turbine-related parts. The seal assembly 60 could find application in other high temperature (and low temperature) situations.

In regard to the various functions performed by the above described elements (e.g., components, assemblies, systems, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function. In addition, while a particular feature have been described above with respect to only one or more of several illustrated embodiments, such feature may be combined with one or more other features of the other embodiments, as may be desired and advantageous for any given or particular application.

The invention claimed is:

1. A seal assembly for sealing first and second static parts with opposed slots together forming a pocket having a ceiling and a floor positioned substantially perpendicular to an expected-leakage-path direction; said seal assembly comprising:

a floor strip having a central portion, a first end portion, a first hinge portion between the central portion and the first end portion, a second end portion, and second hinge portion between the central portion and second end portion;

a ceiling strip having a central portion, a first end portion, a first hinge portion between the central portion and the first end portion, a second end portion, and second hinge portion between the central portion and second end portion;

a connection connecting the central portions together and forming a relatively flat hinge between the first hinge portions, separating them by a first hinge angle and also a hinge between the second hinge portions, separating them by a second hinge angle;

wherein the first hinge portions are convergable to narrow the first hinge angle for insertion of the first portions into the first slot, and the second hinge portions are convergable to narrow the second hinge angle for insertion of the second portions into the second slot, for installation of the seal assembly into the pocket; and wherein the converged first hinge portions are biased to diverge within the pocket to widen the first hinge angle, and the converged second hinge portions are biased to diverge within the pocket to widen the second hinge angle, to thereby seat the end portions of the floor strip against the pocket's floor and to seat the end portions of the ceiling strip against the pocket's ceiling.

2. A seal assembly as set forth in claim 1, wherein each hinge portion follows a relatively linear path between its respective central portion and its respective end portion.

3. A seal assembly as set forth in claim 1, wherein the floor strip and/or the ceiling strip are made of metallic materials.

4. A seal assembly as set forth in claim 1, wherein the floor strip and/or the ceiling strip are made of superalloy materials.

5. A seal assembly as set forth in claim 1, wherein the floor strip and the ceiling strip are made from the same materials.

6. A seal assembly as set forth in claim 1, wherein the floor strip and the ceiling strip are made from different materials.

7. A seal assembly as set forth in claim 1, wherein the first end portions are symmetrical about the connection; the second end portions are symmetrical about the connection.

8. A seal assembly as set forth in claim 1, wherein the first and second end portions of the floor strip are symmetrical about the connection, and wherein the first and second end portions of the ceiling strip are symmetrical about the connection.

9. A seal assembly as set forth in claim 1, wherein the connection integrally joins the floor strip and the ceiling strip into a single-piece assembly.

10. A seal assembly as set forth in claim 1, wherein each end portion follows a relatively curved path between its respective hinge portion and its respective strip's distal end.

11. A seal assembly as set forth in claim 1, wherein the central portion, the end portions, and the hinge portions, of the floor strip cumulatively define its overall length;
wherein the central portion, the end portions and the hinge portions of the ceiling strip cumulatively define its overall length; and
wherein each central portion is at least as long as one of its end portions and/or one of its hinge portions.

12. A seal assembly as set forth in claim 11, wherein each coextensive pair of an end portion and a hinge portion are at least as long as its coextensive central portion.

13. A seal assembly as set forth in claim 12, wherein each hinge portion is longer than its coextensive central portion and/or its coextensive end portion.

14. A seal assembly as set forth in claim 12, wherein each hinge portion is shorter than its coextensive central portion and/or its coextensive end portion.

15. An interface comprising a first static part, a second static part, and the seal assembly set forth in claim 1;
wherein the first static part comprises a first slot and the second static part comprises a second slot, these slots being opposed and together forming a pocket having a floor and a ceiling positioned substantially perpendicular to an expected-leakage-path;
wherein the first end portions and the first hinge portions are positioned within the first slot, and the second end portions and the second hinge portions are positioned within the second slot;
wherein the first hinge portions are biasingly diverged and the second hinge portions are biasingly diverged so that the end portions of the floor strip are seated against the pocket's floor and the end portions of the ceiling strip are seated against the pocket's ceiling.

16. A segmented nozzle assembly comprising a plurality of adjoined nozzle segments and the interface set forth in claim 15 between circumferential edges of the adjoined segments.

17. A segmented shroud assembly comprising a plurality of adjoined shroud segments and the interface set forth in claim 15 between circumferential edges of the adjoined segments.

18. A turbine comprising a segmented assembly, the segmented assembly having a plurality of adjoined nozzle segments and the interface set forth in claim 15 between circumferential edges of the adjoined segments.

19. A gas turbine engine comprising a combustion chamber, wherein combustion gasses are generated, and the turbine set forth in claim 18, wherein the combustion gasses are expanded and energy extracted therefrom.

20. A method of installing the seal assembly set forth in claim 1, in an interface between a first static part and a second static part having opposed slots together forming a pocket having a ceiling and a floor positioned substantially perpendicular to an expected-leakage-path direction; said method comprising:
converging the first hinge portions to narrow the first hinge angle and inserting the first portions into the first slot, and
converging the second hinge portions to narrow the second hinge angle and inserting the second portions into the second slot,
allowing the converged first hinge portions diverge within the pocket to widen the first hinge angle, and allowing the converged second hinge portions diverge within the pocket to widen the second hinge angle, to thereby seat the end portions of the floor strip against the pocket's floor and to seat the end portions of the ceiling strip against the pocket's ceiling.

* * * * *